US010183438B2

(12) United States Patent
Chauvin et al.

(10) Patent No.: US 10,183,438 B2
(45) Date of Patent: Jan. 22, 2019

(54) APPARATUS AND METHOD FOR FABRICATING CONTAINERS

(71) Applicant: NESTEC S.A., Vevey (CH)

(72) Inventors: Guillaume Chauvin, Duchess Manor (SG); Christophe Collin, Fuveau (FR); Damien Kannengiesser, Golbey (FR); Jean-Tristan Outreman, Septemes les Vallons (FR); Jean-Louis Pellegatta, Seillons Source d'Argens (FR)

(73) Assignee: DISCMA AG, Zürich (CH)

( * ) Notice: Subject to any disclaimer, the term of this patent is extended or adjusted under 35 U.S.C. 154(b) by 330 days.

(21) Appl. No.: 14/889,692

(22) PCT Filed: May 6, 2014

(86) PCT No.: PCT/EP2014/059156
§ 371 (c)(1),
(2) Date: Nov. 6, 2015

(87) PCT Pub. No.: WO2014/180805
PCT Pub. Date: Nov. 13, 2014

(65) Prior Publication Data
US 2016/0121539 A1   May 5, 2016

(30) Foreign Application Priority Data
May 7, 2013 (EP) ................................ 13166879

(51) Int. Cl.
*B29C 49/58* (2006.01)
*B29C 49/46* (2006.01)
*B29L 31/00* (2006.01)
*B29K 67/00* (2006.01)
*B29C 49/06* (2006.01)
*B29C 49/12* (2006.01)

(52) U.S. Cl.
CPC .............. *B29C 49/58* (2013.01); *B29C 49/46* (2013.01); *B29C 49/06* (2013.01); *B29C 49/12* (2013.01); *B29C 2049/4664* (2013.01); *B29C 2049/581* (2013.01); *B29C 2049/5803* (2013.01); *B29C 2049/5893* (2013.01); *B29K 2067/003* (2013.01); *B29L 2031/7158* (2013.01)

(58) Field of Classification Search
None
See application file for complete search history.

(56) References Cited

U.S. PATENT DOCUMENTS

| 4,552,527 A | 11/1985 | Hunter |
| 2010/0159058 A1 | 6/2010 | Doudement |
| 2012/0315348 A1 | 12/2012 | Wilson |

FOREIGN PATENT DOCUMENTS

| DE | 102008025775 A1 | 12/2009 |
| FR | 2848905 A1 | 6/2004 |

*Primary Examiner* — Monica A Huson
(74) *Attorney, Agent, or Firm* — Eric J. Sosenko; Jonathan P. O'Brien; Honigman Miller Schwartz and Cohn LLP

(57) ABSTRACT

An injection head for a container-fabricating apparatus. The injection head includes a first nozzle establishing fluid communication between an injection liquid source and a preform cavity of a substantially tubular preform. The first nozzle is configured to mate with a mouth of the preform. An annular mouth seal, provided in the first nozzle, creates a seal with the mouth of the preform when disposed in contact therewith.

12 Claims, 2 Drawing Sheets

APPARATUS AND METHOD FOR FABRICATING CONTAINERS

CROSS-REFERENCE TO RELATED APPLICATIONS

This application is the U.S. national phase of PCT Application No. PCT/EP2014/059156 filed on May 6, 2014, and claims priority to EP13166879.0 filed on May 7, 2013, the entire disclosures of which are herein incorporated by reference herein.

TECHNICAL FIELD

The invention relates to an apparatus for fabricating a container, notably by the method of blow molding. It also relates to a method for employing such an apparatus to fabricate a container

BACKGROUND OF THE INVENTION

It is known to fabricate containers by blow molding, wherein a substantially tubular plastic parison commonly referred to as a "preform" is disposed in the cavity of a mold and expanded into the shape thereof by the injection of a pressurized fluid into said preform. This method lends itself well to the rapid fabrication of containers of consistently high quality.

A common variant of this process is stretch blow molding, in which a stretching rod is inserted into the preform and urged against an interior surface thereof, inducing the preform to deform along its longitudinal axis. This is particularly favored in that it enables one to exercise a greater deal of control over the longitudinal deformation of the preform, thereby enabling the production of a wider range of container shapes and sizes than by simple expansion alone.

A typical blow-molding apparatus comprises a mold, in which is provided a mold cavity in the form of the container to be produced. The preform is provided in a substantially tubular form globally resembling a test tube and which is disposed at least partially within the mold, conventionally being inserted into the mold cavity through a hole disposed in an upper surface of the mold.

Preferably, a small portion of the preform protrudes from the mold, permitting the attachment of an injection head to a mouth of the preform in communication with an internal cavity of the preform. This mouth portion of the preform is usually furnished with threads, rims, or other such means for interfacing with a closure device such as a cap, and remains substantially unchanged during the container forming process while the rest of the preform is expanded into a container. Generally, the preform is provided with a neck ring, which during the molding process sits upon the top surface of the mold and prevents the preform from falling through.

Optionally, the preform is heated prior to being inserted into the mold, to facilitate its deformation during the forming of the container.

The injection head is the means by which the molding apparatus interfaces with the preform, the injection head comprising a nozzle or other such channel configured to establish fluid communication between the mouth of the preform and a source of a pressurized fluid. During the operation of the apparatus, the pressurized fluid is injected into the cavity of the preform through the injection head, thereby inducing the preform to undergo plastic deformation and expand to assume the contours of the mold.

Since the fluid is injected at high pressure into the preform, it becomes necessary to provide a means in the nozzle of the injection head to create a secure seal with the preform, so as to avoid leakage of the pressurized fluid and subsequent malformations of the container due to the resultant loss of pressure.

Generally, this is accomplished by creating a seal between the nozzle and the top surface of the mold around the mouth of the preform. For example, the French patent application publication No 2 848 905 describes an injection head which is broadly bell-shaped, being configured to fit over the portion of the preform which protrudes from the mold. The injection head is pressed against the mold by mechanical, pneumatic, hydraulic, or magnetic means, creating a sealed chamber in communication with the cavity of the preform by way of the seal between its rim and the top surface of the mold surrounding the preform.

As initially conceived, the pressurized fluid injected into the preform is a gas, for instance compressed air. It has become known to inject a liquid into the preform, in particular the liquid which is ultimately to be packaged in the container thereby fabricated. This is advantageous relative to the former technique, in that it combines the steps for forming and filling the container and thereby realizes economies of space and time in the production of containers.

However, the injection nozzles known in the prior art are far from ideal for the injection of liquids. Specifically, the bell-shaped design of the nozzles known in the prior art, which seal to the top surface of the mold, will result in an amount of injection liquid being retained in the space above and around the preform within the injection nozzle.

This liquid will leak from the injection nozzle when the seal between it and the mold is broken, and infiltrate the mold cavity when the mold is opened to remove the finished container. The presence of the liquid within the mold cavity will cause malformations of the container in subsequent container forming cycles of the apparatus, hinder the attachment of labels or other markings to the container, and may implicate cleanliness concerns if the injection liquid contains alimentary substances such as oils or sugars. Such systems require the use of cleaning and/or drying systems to clean the mold cavity and the container after the conclusion of the forming process, adding expense to the forming process and slowing the rate at which containers may be formed and filled.

It is therefore an object of the invention to provide an injection nozzle for a blow molding apparatus which resolves the disadvantages of the prior art as detailed above.

SUMMARY OF THE INVENTION

In a first aspect of the invention, there is provided an injection head for a container-fabricating apparatus, comprising a first nozzle configured to establish fluid communication between an injection liquid source and a preform cavity communicating with a mouth of a substantially tubular preform.

According to the invention, said first nozzle is configured to mate with said mouth of said preform, an annular mouth seal being provided in said first nozzle and defining an internal circumference of said first nozzle at a distal end thereof such that said first nozzle creates a seal with said mouth of said preform when disposed in contact therewith.

This is advantageous in that an injection head so configured will create a seal with the preform that does not circulate the injection liquid about the exterior of the preform during the forming of the container as in the prior art.

When the injection head is retracted from the container and the seal broken between the first nozzle and the mouth of the preform, there will be no liquid disposed about the mouth of the preform to leak out and contaminate the mold.

Furthermore, creating a seal directly between the mouth of the preform and the nozzle of the injection head will reduce the overall volume of the fluid path through the injection head between the injection fluid source and the preform cavity of the preform, relative to the injection heads known in the prior art. This reduction in dead volume will permit the user to exercise an increased degree of control over the injection of the liquid into the preform during the forming process, improving the control and economy of the operation of the apparatus employing such an injection head.

In a preferred embodiment of the invention, the injection head further comprises a second nozzle extending from and in fluid communication with said first nozzle, said second nozzle comprising a substantially cylindrical nozzle cavity having an internal diameter greater than the internal diameter of said first nozzle, said nozzle cavity being bounded at a proximal end by said first nozzle and at a distal end by an annular shoulder seal defining an internal circumference of said nozzle cavity, such that said shoulder seal of said second nozzle creates a seal with a neck ring of the preform when said first nozzle is disposed in contact with the mouth of said preform.

This is advantageous in that the provision of the second nozzle with the shoulder seal adds a redundant sealing element that will minimize the leakage of fluid in the injection head should the seal between the first nozzle and the mouth of the preform fail during forming. This reduces the spillage of product in the event of such a seal failure, and any resultant malformation or underfilling of the containers. Advantageously, the second nozzle further comprises a channel establishing fluid communication between the nozzle cavity and a source of pressurized compensation fluid.

This is advantageous in that the portion of the nozzle cavity disposed between the first and second nozzles and the preform will be pressurized by the compensation fluid, counteracting the pressure exerted by the pressurized injection liquid in the preform cavity during the fabrication of a container. This enables one to reduce the thickness of the walls of the preform at the open end thereof, thereby reducing the weight of the preform and the expense of its fabrication.

In a possible embodiment, the injection head further comprises a stretching rod configured to bear upon an internal surface of the preform so as to induce said preform to deform along a longitudinal axis thereof.

This is advantageous in that the provision of such a stretch rod further improves the control the user has over the expansion of the container. Specifically, when combined with the advantages of the injection head according to the present invention as described above, the user may exercise an improved precision in the control of the expansion of the container.

In a further possible embodiment, the injection head further comprises an injection valve configured to selectively block fluid communication between the fluid source and the preform cavity of the preform.

This is advantageous in that it achieves a reduction in the dead volume in the injection head to that which is disposed between the injection valve and the first nozzle, realizing the advantages as described above.

In a second aspect of the invention, there is provided a container-fabricating ensemble comprising a substantially tubular preform comprising a preform cavity in communication with a mouth disposed at an open end of said preform and a neck ring disposed at said open end at a distance from said mouth; and at least one injection head as described above.

This is advantageous in that such an ensemble will produce a formed container from the preform, thereby embodying the advantages of the invention.

In a third aspect of the invention there is provided a method for fabricating a container, comprising the steps of providing a substantially tubular preform comprising a preform cavity in communication with a mouth disposed at an open end of said preform and a neck ring disposed about said open end at a distance from said mouth; disposing said preform in a mold having a mold cavity substantially in the form of a container; positioning an injection head in fluid communication with said preform, said injection head comprising a first nozzle having an annular mouth seal bearing against said mouth of said preform and creating a seal therewith; and injecting a volume of an injection liquid from an injection liquid source through said injection head into said cavity of said preform, said preform being thereby induced to expand into the shape of said mold cavity.

This is advantageous in that such a method will form and fill containers in a way that will greatly reduce or eliminate the leakage and spilling of the injection liquid from the preform. Specifically, since a seal is created directly between the injection head and the mouth of the preform, there is no injection liquid which remains in the area around the open end region of the preform once the container is formed, as in the prior art.

This eliminates the possibility of injection liquid infiltrating the mold cavity and the resultant complications in the molding of subsequent containers.

In a practical embodiment of the invention, the injection head further comprises a second nozzle extending from and communicating with said first nozzle, said second nozzle comprising a substantially cylindrical nozzle cavity having an annular shoulder seal at a distal end thereof, such that during the positioning step said shoulder seal of said second nozzle creates a seal with the neck ring of the preform.

This is advantageous in that the provision of the second nozzle with the shoulder seal, and the resultant enclosure of the nozzle cavity, add a redundant sealing element that will minimize the leakage of fluid in the injection head should the first resilient sealing ring fail during operation.

Accordingly, the method preferably further comprises a pressurizing step substantially concurrent to the injecting step wherein a pressurized compensation fluid is injected into the nozzle cavity through a channel establishing fluid communication between said nozzle cavity and a source of pressurized compensation fluid.

Most preferably, the pressure of the compensation fluid is substantially equal to the pressure of the injection liquid.

This is advantageous in that the portion of the nozzle cavity disposed between the first and second nozzles and the preform will be pressurized by the compensation fluid, counteracting the pressure exerted by the pressurized injection liquid in the preform cavity during the injecting step. This counteracting permits one to provide the preform with thinner walls than would otherwise be possible, reducing the weight and cost of each preform. Injecting the compensation fluid at a pressure substantially equal to the injection liquid will realize this effect to the greatest degree.

In a preferred embodiment, the compensation fluid is compressed air.

This is advantageous in that compressed air is generally simple to furnish, even in a high-volume supply. Compressed air may also be sterilized and provided in a sterile form without difficulty, making it particularly advantageous where the container being fabricated is to contain an alimentary substance.

DETAILED DESCRIPTION

For a complete understanding of the present invention and the advantages thereof, reference is made to the following detailed description of the invention. It should be appreciated that various embodiments of the present invention can be combined with other embodiments of the invention and are merely illustrative of the specific ways to make and use the invention and do not limit the scope of the invention when taken into consideration with the claims and the following detailed description. In the present description, the following words are given a definition that should be taken into account when reading and interpreting the description, examples and claims.

"Preform" is a substantially tubular object fabricated from a thermoplastic resin and configured to interface with an apparatus for molding it into a container;

"Injection Liquid" is a non-compressible liquid substance injected under pressure into said preform during a process for the forming of the latter so as to induce said preform to plastically deform; and A "Neck Ring" is a flattened annular projection disposed upon the surface of the preform, serving to separate the neck of the preform, proximal to its mouth, from a body of the preform distal from its mouth.

As used in this specification, the words "comprises", "comprising", and similar words, are not to be interpreted in an exclusive or exhaustive sense. In other words, they are intended to mean "including, but not limited to."

Any reference to prior art documents in this specification is not to be considered an admission that such prior art is widely known or forms part of the common general knowledge in the field.

The invention is further described with reference to the following examples. It will be appreciated that the invention as claimed is not intended to be limited in any way by these examples.

Figure 1:
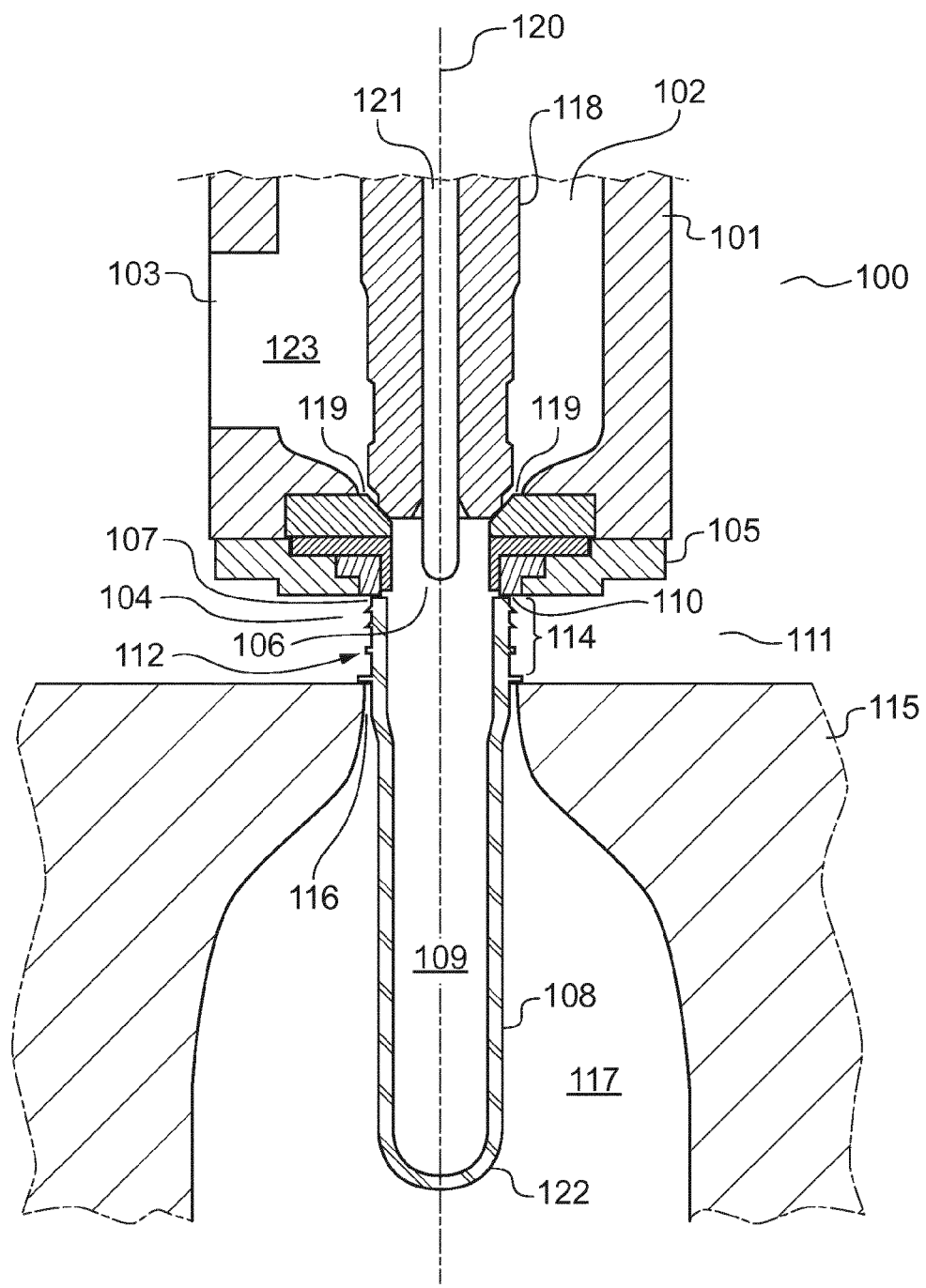
FIG. 1 is a lateral cross-section view of an injection head according to a first embodiment of the invention.

FIG. 1 is a lateral cross-section view of an injection head 100 according to a first embodiment of the invention. The injection head 100 comprises a body 101 defining an internal cavity 102. The internal cavity 102 communicates with an injection liquid port 103 at one extremity of its circulation, and with the first nozzle 104 at another extremity.

The first nozzle 104 consists of a nozzle plate 105 defining a nozzle orifice 106. At the nozzle orifice 106 is disposed the annular mouth seal 107. The nozzle plate 105 may be provided as an integral part of the body 101; but is preferably provided, as depicted here, as a separate piece, to facilitate the replacement of the mouth seal 107 during maintenance of the injection head 100.

Here, the mouth seal 107 is provided in a particular form, being an extrusion of the profile as shown into a substantially annular form. Preferably, the mouth seal 107 is furnished with a means for facilitating its retention in the injection head, for instance the lip 107A which is sandwiched between the body 101 and the nozzle plate 105. The precise configuration of the mouth seal may be determined by the user as appropriate for each individual application.

The injection head 100 is configured to be disposed upon a preform 108 and create a seal therewith. The preform 108 is substantially tube-shaped, as shown here, enclosing a preform cavity 109 which communicates with the mouth 110 at an open end 111 of the preform 108.

The preform 108 is preferably fabricated from polyethylene terephthalate (PET) resin, as it generally molds easily and has an advantageous strength to weight ratio.

However, other plastic resins such as low-, medium-, or high-density polyethylene (L/M/HDPE), polypropylene (PP), and the like may equally be employed, depending on the particular characteristics of the container to be fabricated and the substance to be contained therein.

The preform 108 is, in this embodiment, fabricated by injection molding, which produces preforms of uniformly-high quality in a manner well-suited for industrial-scale production. However, other methods of production, such as extrusion, may possibly be employed in other embodiments.

The preform 108 is provided with threads 112 at the open end 111. The threads 112 are formed when the preform 108 is fabricated and remain substantially unchanged during the forming of the container, being thereafter used to engage a cap or other closure device to effectuate the sealing of the container.

The preform 108 is also provided with a neck ring 113. An open end region 114 of the open end 111 of the preform 108 between the mouth 110 and the neck ring 113 is thereby delineated, which comprises the walls of the preform 108 and the threads 112.

The preform 108 is inserted into the mold 115 through the mold orifice 116, the being held in place by the neck ring 113 which rests on the surface of the mold 115. The preform 108 is thereby substantially disposed within the mold cavity 117 within the mold 115, which is substantially in the shape of the container to be fabricated. While not depicted here for the sake of simplicity, the mold 115 is provided in several segments, to permit the extraction of the finished container once the fabrication process is completed.

In this embodiment, the injection head 100 is further provided with an injection valve 118, which is configured to seat in the valve seats 119 disposed in the nozzle orifice 106. The seating of the injection valve 118 in valve seats 119 will block off the nozzle orifice 106; the injection valve 118 is thereby made mobile along the longitudinal axis 120, so as to selectively permit flow from the injection liquid port 103 to the nozzle orifice 106 and into the mouth 110 of the preform 108.

Preferably, the injection valve 118 and valve seats 119 are hardened to provide improved sealing and wear characteristics. The valve seats 119 are preferably provided as distinct components, as shown here, to facilitate their refurbishment or replacement during any servicing of the injection head 100.

In this embodiment, the injection head further comprises a stretching rod 121, disposed coaxially with the nozzle orifice 106 and the injection valve 118 about the longitudinal axis 120. The stretching rod 121 is translatably mobile along the longitudinal axis 120 relative to both the nozzle orifice 106 and the injection valve 118. During the forming of the container, the stretching rod is advanced into the preform cavity 109 of the preform 108 into contact with the distal end 122 thereof, being pressed into it so as to induce it to deform along the longitudinal axis 120.

When the injection head 100 is positioned upon the preform 108, the mouth seal is borne against the mouth 110 of the preform 108, creating a seal therewith. The injection head 100 is preferably pressed into the preform 108 to increase the resistance of the seal created between the two; the degree of pressing force used will be a function of the dimensions of the mouth 110 and the mouth seal 107, and the pressure that is required to deform the preform 108 into the mold cavity 117, and will thus vary from application to application.

Once the injection head 100 is so positioned, the injection valve 118 is retracted from the valve seats 119 and fluid communication is established between the injection liquid port 103 and the preform cavity 109. The injection liquid port 103 is in communication with a pressurized injection liquid source (not shown), from which a volume of injection liquid 123 is conducted into the preform cavity 109 to expand the preform 108 into the mold cavity 117 and form a container.

Figure 2:
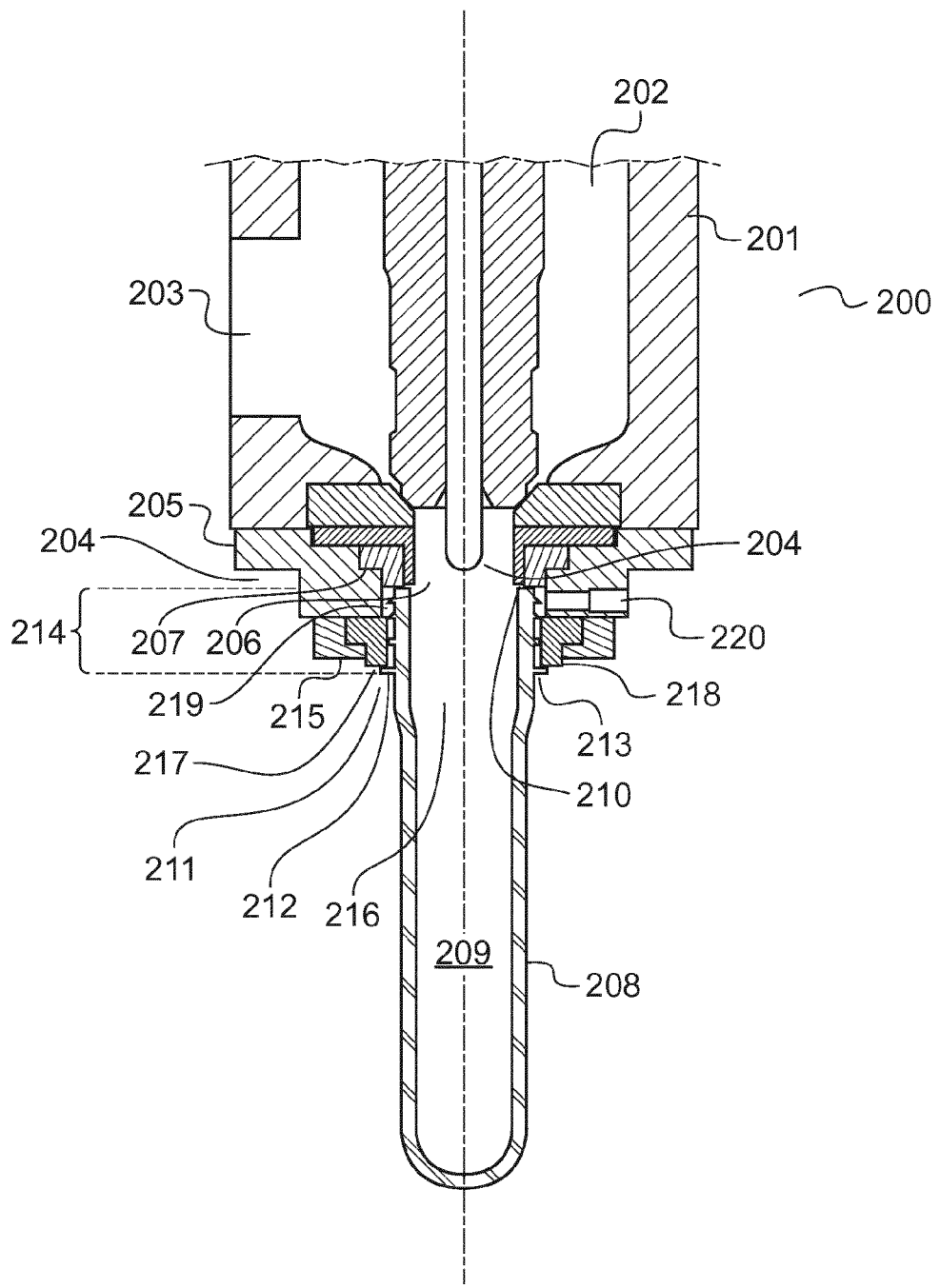
FIG. 2 is a lateral cross-section view of an injection head according to a second embodiment of the invention.

FIG. 2 is a lateral cross-section view of an injection head 200 according to a second embodiment of the invention. The injection head 200 is similar to the injection head 100 of the first embodiment as depicted in FIG. 1 (though the mold is omitted here for clarity). Specifically, it comprises a body 201 enclosing an internal cavity 202, an injection liquid port 203, and a first nozzle 204. At the first nozzle 204 there is provided a first nozzle plate 205 defining a first nozzle orifice 206, in which is seated a mouth seal 207.

As in the first embodiment, there is provided a preform 208 enclosing a preform cavity 209 and being provided with a mouth 210 at an open end 211 of said preform 208. The preform 208 further comprises threads 212 disposed at said open end 211 as well as a neck ring 213. As in the first embodiment, the mouth 210 and the neck ring 213 define an open end region 214 of the preform 208.

The injection head 200, according to this embodiment, further comprises a second nozzle plate 215, which is attached to the first nozzle plate 205. The first and second nozzle plates 205 & 215 together create the second nozzle 216 projecting from and communicating with said first nozzle orifice 206, the second nozzle 216.

At the distal end of the second nozzle 216 there is disposed the second nozzle orifice 217, which is preferably provided with an annular shoulder seal 218. This defines the substantially cylindrical nozzle cavity 219 within the second nozzle 216.

The second nozzle 216 is configured such that when the injection head 200 is disposed upon the preform 208, the mouth seal 207 is provided in an annular form to create a seal between the first nozzle orifice 206 and the mouth 210 of the preform 208; and the shoulder seal 218 creates a seal between the second nozzle orifice 217 and the neck ring 213 of the preform 208.

Furthermore, there is a channel 220 provided in the second nozzle plate 215, establishing fluid communication with the portion of nozzle cavity 219 enclosed by the first and second nozzle plates 205 & 215, the mouth and neck rings 207 & 217, and the preform 208. The channel 220 is preferably connected to a source of a pressurized compensation fluid (not shown).

During the fabrication of a container, it is advantageous to inject a compensation fluid into the nozzle cavity 219. This will reduce the pressure difference across the wall of the preform 208 at the open end region 214, permitting the wall of the preform to be made thinner at this location.

In this embodiment it is envisioned that the compensation fluid is sterile, pressurized air, furnished by a compressor or similar means. Of course, in other embodiments it is possible to utilize other fluids as appropriate to the situation. For instance, gases such as carbon dioxide, nitrogen, or argon may be employed; or alternately it may in non-alimentary applications be more efficient to utilize a fast-evaporating liquid such as alcohol.

The injection of the compensation fluid into the nozzle cavity 219 is preferably coordinated with the opening of the injection valve 221 and the advancement of the stretching rod 222 along the longitudinal axis 223 of the preform 208, so as to achieve an optimal compensation effect at the open end 211 of the preform 208 and an optimal expansion of the preform 208 in general.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. An injection head for a container-fabricating apparatus, comprising a first nozzle configured to establish fluid communication between an injection liquid source and a preform cavity communicating with a mouth of a substantially tubular preform, the first nozzle having an annular mouth seal provided at a distal end of the first nozzle and configured to mate with the mouth of the preform, the annular mouth seal defining an inner circumference of a fluid passageway through the first nozzle such that the annular mouth seal creates a seal with the mouth of the preform when disposed in contact therewith.

2. An injection head for a container-fabricating apparatus, comprising:
   a first nozzle configured to establish fluid communication between an injection liquid source and a preform cavity communicating with a mouth of a substantially tubular preform, said first nozzle configured to mate with said mouth of said preform, an annular mouth seal provided in said first nozzle and defining at a distal end thereof an inner circumference of the fluid passageway through said first nozzle such that said first nozzle creates a seal with said mouth of said preform when disposed in contact therewith; and
   a second nozzle extending from the distal end of said first nozzle, said second nozzle defining a substantially cylindrical nozzle cavity having an inner diameter greater than an inner diameter of said first nozzle, said nozzle cavity being axially bounded at one end by the distal end of said first nozzle and at a second end by an annular shoulder seal defining an inner circumference of said nozzle cavity, said shoulder seal of said second nozzle configured to create a seal with a neck ring of the preform when said first nozzle is disposed in contact with the mouth of said preform.

3. The injection head as claimed in claim 2, wherein the second nozzle further comprises a channel establishing fluid communication between the nozzle cavity and a source of pressurized compensation fluid.

4. The injection head as claimed in claim 1, further characterized in that the injection head further comprises a stretching rod configured to bear upon an internal surface of the preform so as to induce said preform to deform along a longitudinal axis thereof.

5. The injection head as claimed in claim 1, further wherein the injection head further comprises an injection valve configured to selectively block fluid communication between the injection liquid source and the preform cavity of the preform.

6. A container-fabrication ensemble comprising a substantially tubular preform comprising a preform cavity in communication with a mouth disposed at an open end of said preform and a neck ring disposed at said open end at a distance from said mouth; and at least one injection head as claimed in claim 1.

7. A method for fabricating a container comprising the steps of:
providing a substantially tubular preform having a preform cavity in communication with a mouth disposed at an open end of said preform, said preform also having a neck ring disposed about said open end at a distance from said mouth;
disposing said preform in a mold, the mold having a mold cavity substantially in the form of a container;
positioning an injection head in fluid communication with said preform, said injection head including a first nozzle having an annular mouth seal at a distal end thereof and defining an inner diameter of a passageway through the first nozzle, the positioning of the injection head causing the annular mouth seal to bear against the mouth of the preform and creating a seal therewith; and
injecting a volume of an injection liquid from an injection liquid source through said injection head into said cavity of said preform, said preform being thereby induced to expand into the shape of said mold cavity.

8. The method as claimed in claim 7, wherein said injection head further comprises a second nozzle extending from and communicating with said first nozzle, said second nozzle defining a substantially cylindrical nozzle cavity having an annular shoulder seal at a distal end thereof, such that during the positioning step said shoulder seal of said second nozzle creates a seal with the neck ring of the preform.

9. The method as claimed in claim 8, wherein the method further comprises a pressurizing step substantially concurrent to the injecting step wherein a pressurized compensation fluid is injected into the nozzle cavity through a channel establishing fluid communication between said nozzle cavity and a source of pressurized compensation fluid.

10. The method as claimed in claim 9, wherein the pressure of the compensation fluid is substantially equal to the pressure of the injection liquid.

11. The method as claimed in claim 9, wherein the compensation fluid is compressed air.

12. The injection head according to claim 2, wherein the injection head is provided as part of a container-fabrication ensemble comprising a substantially tubular preform having a preform cavity in communication with a mouth disposed at an open end of said preform and a neck ring disposed at said open end at a distance from said mouth.

\* \* \* \* \*